H. M. DOMECQ-CAZAUX.
PUMPING AND COMPRESSING APPARATUS FOR AERIFORM FLUIDS.
APPLICATION FILED JUNE 13, 1906.
900,988.
Patented Oct. 13, 1908.
2 SHEETS—SHEET 2.
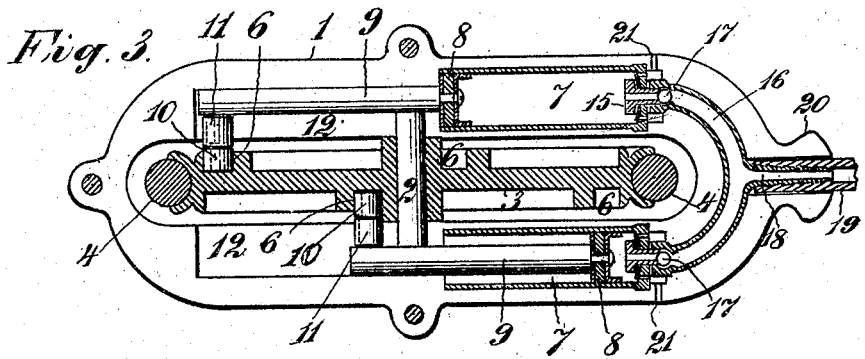
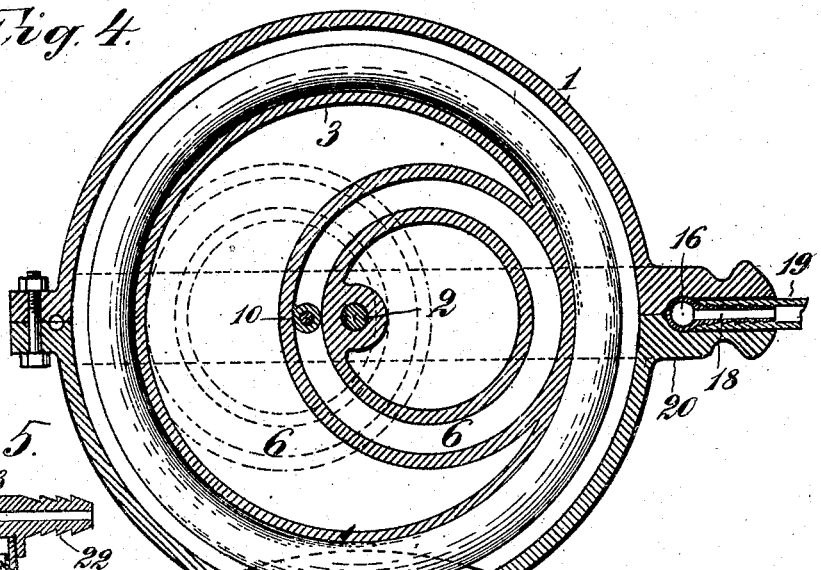
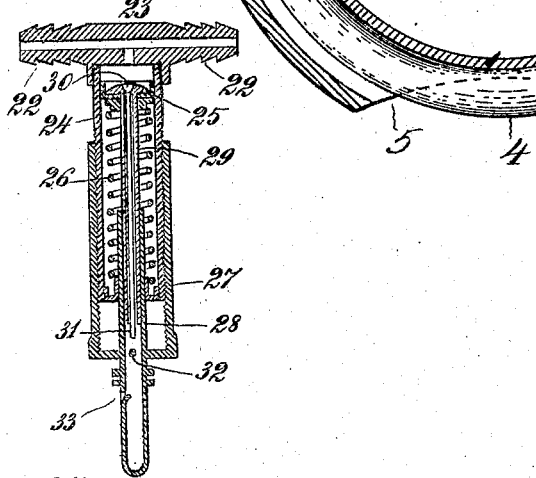
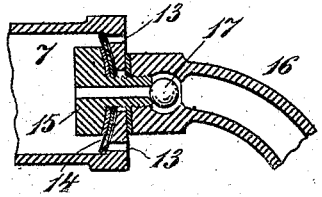

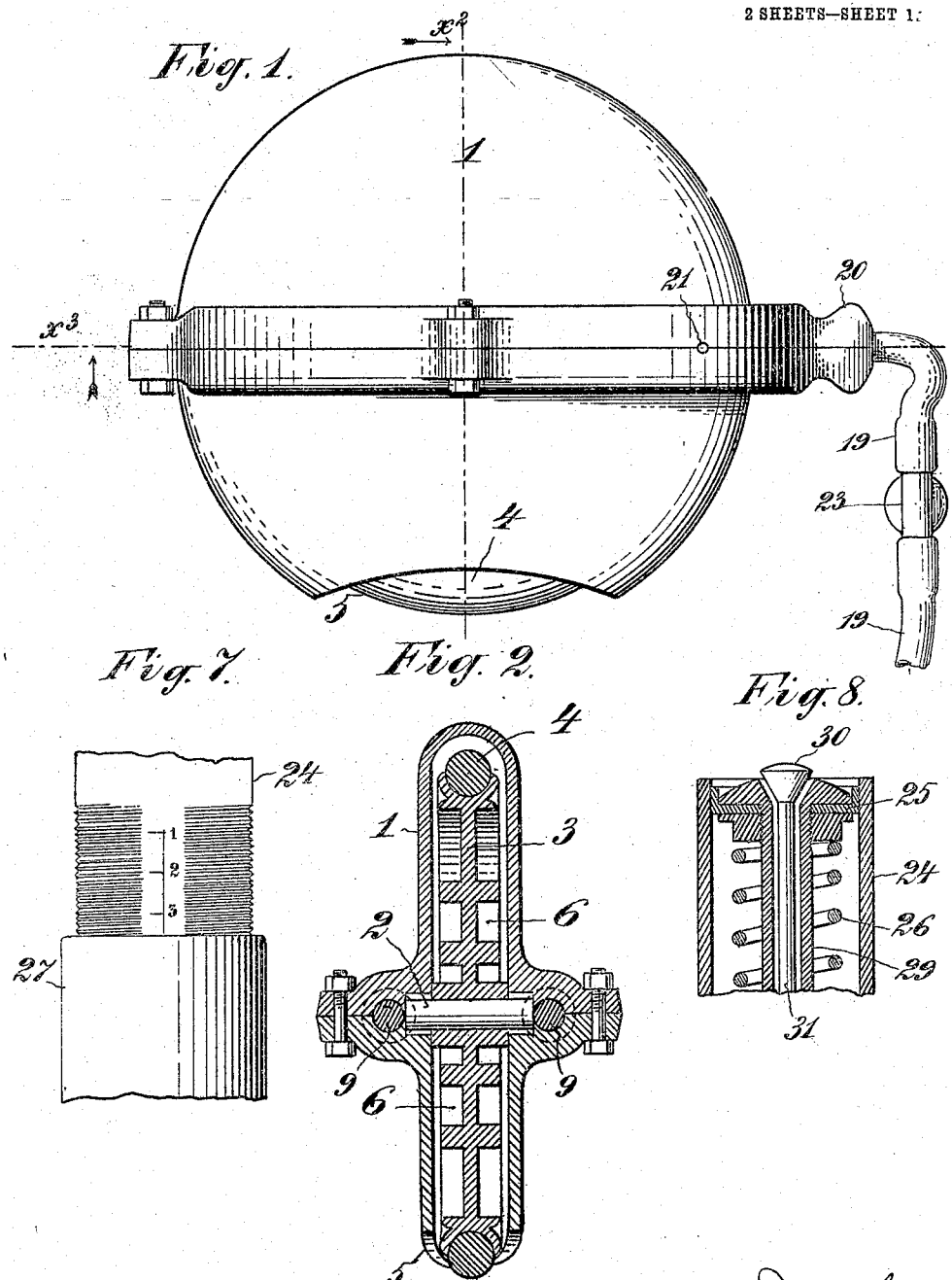

UNITED STATES PATENT OFFICE.

HONORÉ MAURICE DOMECQ-CAZAUX, OF PARIS, FRANCE.

PUMPING AND COMPRESSING APPARATUS FOR AERIFORM FLUIDS.

No. 900,988.  Specification of Letters Patent.  Patented Oct. 13, 1908.

Application filed June 13, 1906. Serial No. 321,581.

*To all whom it may concern:*

Be it known that I, HONORÉ MAURICE DOMECQ-CAZAUX, a citizen of the French Republic, residing in Paris, France, have invented certain new and useful Improvements in Pumping and Compressing Apparatus for Aeriform Fluids, of which the following is a specification.

This invention relates to pumping and compressing devices for aeriform fluids, and it has for its object to provide a simple apparatus of relatively small size which may be driven from a rotary part of a motor, either by friction or a belt.

The apparatus may of course be employed to pump and compress air or gas for any purpose desired, but it is especially designed for use on motor cars or automobiles to pump up the tires, to sound the horn, to operate the brakes, and to supply compressed air to the internal combustion engine of the car or automobile, if such an engine be used.

In the accompanying drawings which serve to illustrate an embodiment of the invention—Figure 1 is a side elevation of the apparatus. Fig. 2 is a transverse section at $x^2$ in Fig. 1. Fig. 3 is a transverse section at $x^3$ in Fig. 1. Fig. 4 is a face-view of the driving wheel, the casing being in mid-section. Fig. 5 is an axial, sectional view of a pressure indicator in the outlet or delivery pipe of the apparatus, and which takes the place of a manometer. Fig. 6 is an elongated detail sectional view of the pump valves. Figs. 7 and 8 are details which will be hereinafter described.

As herein shown the apparatus is represented as adapted to be driven through frictional contact with the fly-wheel of the motor.

In a suitable casing 1, made for convenience in two halves or sections, bolted together, is rotatively mounted an arbor 2, on which is a wheel 3, provided with a circumferentially grooved rim to receive a tire 4 of rubber or the like. The casing is cut away at 5 to expose the tire so that it may be pressed against a driving wheel, as for example the fly-wheel of the driving motor. On the respective opposite faces of the wheel 3, are cam-grooves 6, eccentric to the axis of the wheel and disposed 180° apart, or opposite, as clearly indicated in Fig. 4. As herein shown these grooves are circular and form eccentrics. At the respective sides of the wheel 3, in the casing, are two like reciprocating pumps, each having a chamber 7, a reciprocating piston 8, and a piston-rod 9. Each rod has at its outer end a laterally projecting wrist or pin, provided with an antifriction roller 10, engaging the groove 6, at that side of the wheel, and also a roller 11, to bear on the walls of a guideway 12 formed in the casing. It will be noted by inspection of Fig. 3 that each pump is operated by the eccentric groove 6 on the same side of the wheel 3 as the pump, and that the pump-pistons move in opposite directions simultaneously.

The pumps are single acting and each has at its inner end an inlet for fluid and an outlet for the compressed fluid. These are best seen in Fig. 6, wherein 13 designates one or more air-inlets controlled by a flexible disk-valve 14 inside of the cylinder, and held in place by a screw-threaded tubular nipple 15, on which screws the outlet pipe or conduit 16. In a cage in the pipe 16 is incarcerated a ball-valve 17 controlling the outlet. The pipe 16 is arched, its respective ends connecting with the eduction sides of the pumps, and to a branch or nipple 18 on said arched pipe is coupled a pipe or hose 19. The casing has on it a tubular projection 20 through which the nipple 18, for the compressed fluid, passes out. The air is taken into the casing through suitable apertures in its wall as indicated at 21 in Fig. 1. The rotation of the wheel 3 compels reciprocation of the pump-pistons in alternate order, as will be readily understood; the compressed fluid passing to the pipe or hose 19 through the curved pipe 16.

The device seen in Fig. 5 on a relatively large scale, is in the pipe 19, (as seen in Fig. 1) being inserted by cutting the said pipe and connecting up its sections to this device through the medium of the nipples 22, 22. The pressure indicator and regulator seen in Fig. 5 comprises the tubular part 23 which has a lateral outlet leading into a chamber formed of a cylindrical, externally screw-threaded cylinder 24, in which plays a piston 25, held up, normally to the lateral outlet of the tube 23 by a spring 26. The cylinder 24 screws into another or outer cylinder 27, and the former has in it an annular end-piece on which the inner end of the spring abuts. Fixed in the cylinder 27 is an upright axial tube 28, in which slides telescopically a tube 29 pendent from the piston 25. In the piston is a valve-seat to receive a conical valve 30, which has a stem 31 which depends through the tube 29. In the tube 28, below, is a cross-pin 32, for the valve-stem 31 to impinge upon when the piston descends far enough; and connected with the lower or outer end of the tube 28, is a whistle 33.

The operation of this device is as follows: The compressed fluid—as air—flowing through the tubular part 23, acts on the piston 25 to displace it outwardly in the cylinder 24, the spring 26 resisting such displacement; and the valve 30, held to its seat by the fluid-pressure, moves with the piston until the stem 31, impinges on the cross-pin 32, when the movement of the valve is arrested and the further movement of the piston displaces the valve from its seat and permits the fluid to flow through the tubes 28 and 29 to the whistle 33, and sound it, thus announcing that a predetermined pressure has been reached. The point in the displacement of the piston at which the valve shall open and the whistle sound, may be regulated by screwing the outer cylinder 27, which carries the pin 32, in or out on the cylinder 24. Fig. 7 is a detail side view of parts of the cylinders showing graduation marks 34 on the cylinder 24 to indicate the pressure in atmosphere predetermined by the adjustment of the pin 32; and Fig. 8 is an enlarged sectional detail showing the valve 30 lifted from its seat.

The present invention applies only to the apparatus described; it may be mounted so that its tire 4 can be put into frictional contact with the fly-wheel of the motor by means of a treadle. The casing 1 may be, of course, any kind of frame to carry and connect the operative parts of the apparatus.

Having thus described my invention, I claim—

1. An apparatus for the purpose specified, having a frame to support the operative parts, a rotatively mounted wheel in said frame, said wheel having a tire of yielding material and being provided with circular eccentric grooves on its respective lateral faces, set 180 degrees apart, two single-acting pumps mounted in the frame on opposite sides, respectively, of said wheel, each pump having a wrist on its rod engaging an eccentric groove in the wheel, valves controlling the induction and eduction apertures of the pump, and a pipe connecting with the eduction sides of both pumps.

2. An apparatus for the purpose specified, having a casing 1 with an aperture 5 in its side, a grooved wheel 3 mounted rotatively in said casing, said wheel having on its respective lateral faces circular eccentric grooves 6, the centers of which are disposed at opposite sides of the center of the wheel, a rubber tire on the wheel, two single acting pumps disposed at opposite sides of the said wheel, said pumps having each a piston, piston-rod, and valves controlling the induction and eduction of the fluid, a wrist bearing an antifriction roller on each piston-rod and engaging the respective eccentric grooves 6, an arched conduit 16 connected at its ends with the eduction sides of the respective pumps, and a pipe or hose 19, connected with the pipe 16, as set forth.

In witness whereof I have hereunto signed my name this 1st day of June, 1906, in the presence of two subscribing witnesses.

HONORÉ MAURICE DOMECQ-CAZAUX.

Witnesses:
HENRI LETTAL,
HANSON C. COXE.